(No Model.)
W. H. LE CHARD & J. A. BEST.
LONG SCREW PIPE COUPLING AND FITTING.
No. 578,933. Patented Mar. 16, 1897.
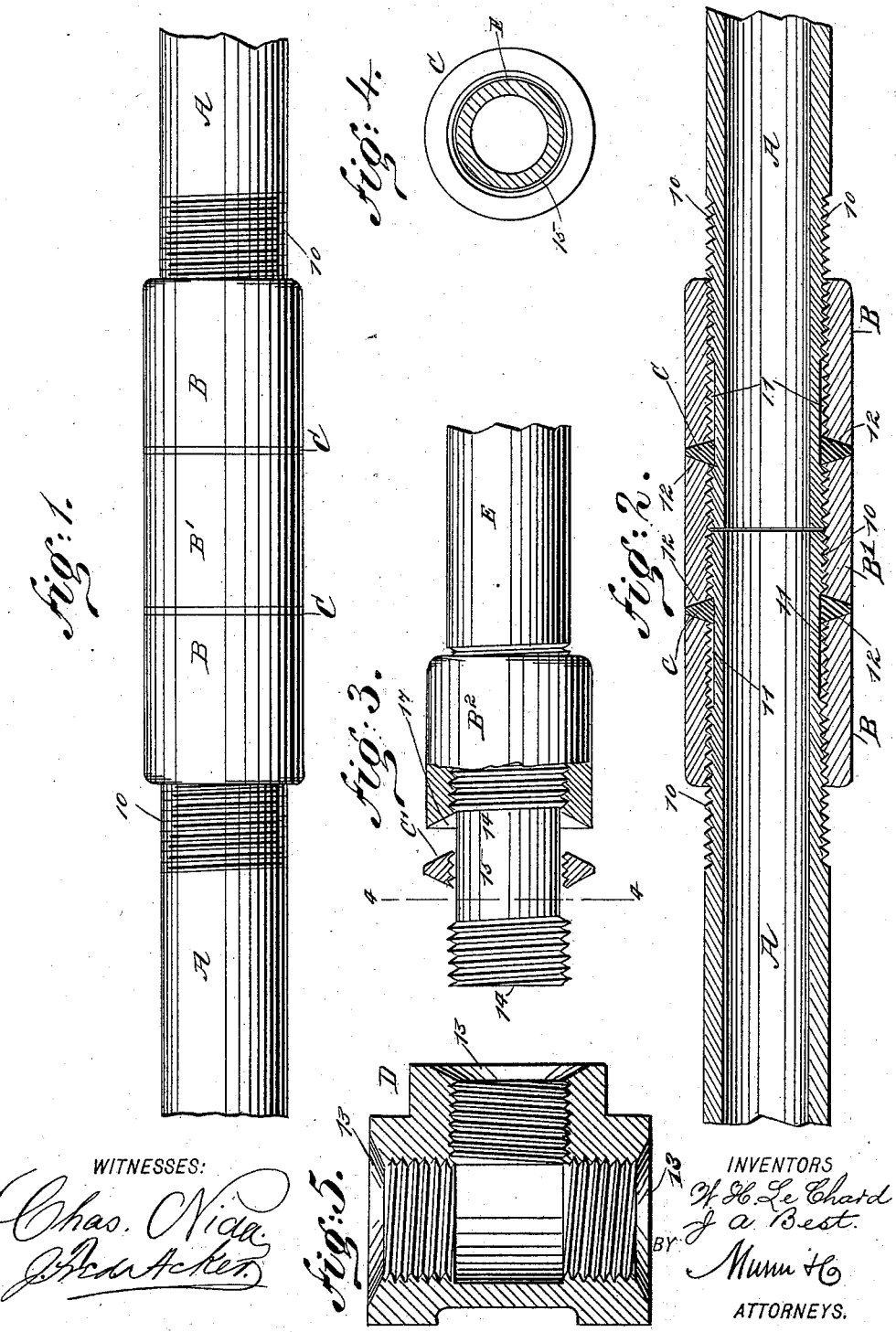

UNITED STATES PATENT OFFICE.

WILLIAM HENRY LE CHARD AND JOHN ARTHUR BEST, OF ATLANTIC CITY, NEW JERSEY.

LONG-SCREW PIPE COUPLING AND FITTING.

SPECIFICATION forming part of Letters Patent No. 578,933, dated March 16, 1897.

Application filed October 15, 1895. Serial No. 565,736. (No model.)

*To all whom it may concern:*

Be it known that we, WILLIAM HENRY LE CHARD and JOHN ARTHUR BEST, of Atlantic City, in the county of Atlantic and State of New Jersey, have invented a new and useful Improvement in Long-Screw Pipe Couplings and Fittings, of which the following is a full, clear, and exact description.

Our invention relates to an improvement in long-screw pipe couplings and fittings, or steam, gas, water, or ammonia pipe fittings, and especially such fittings or pipe-couplings that are intended to stand high pressure. The object of the invention is to provide the threaded portions of the pipe-sections with plain surfaces, usually made by turning down the threads, so as to leave a space between two threaded portions, and compressing or otherwise securing on the plain surfaces thus made soft-metal collars to be used for packing and making tight joints, being an improvement on the old method of wrapping the joints between sockets or lock-nuts with lamp-wick or other soft packing, which latter is a source of annoyance, especially when the coupling is to be taken apart, and to provide an improved pipe-coupling in which the packing-collar will always be at hand and in position for use no matter how many times the pipe-sections may be coupled or uncoupled.

A further object of the invention is to so shape the sockets, locks, or jam-nuts employed, and likewise the mouth portions of fittings, that the soft-metal collars will be effectually compressed between such opposing surfaces, the collars being wider at their inner than at their outer peripheral portions.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a long-screw pipe-coupling made in accordance with our invention. Fig. 2 is a longitudinal section through the coupling shown in Fig. 1 and which is effectually used in ammonia-pipe fittings. Fig. 3 is a side elevation of a portion of a pipe, the jam or lock nut and metal collar being in section and the pipe being arranged for connection with the fitting. Fig. 4 is a transverse section taken through the plain or smooth surface of the pipe, practically on the line 4 4 of Fig. 3; and Fig. 5 is a section through a T-fitting adapted to be connected with the pipe-section shown in Fig. 3.

In carrying out the invention the sections A of the pipe that are to be coupled are provided with a threaded surface 10 at one or at both ends, as occasion may demand, and each threaded surface, between its ends, has its outer face turned down to the bottom of the threads to form a smooth surface 11, whereby such a smooth surface will be provided between two threaded surfaces, and upon the plain or smooth surfaces 11 of the pipe-sections soft-metal collars C are compressed or otherwise placed, and these collars are provided with tapering side surfaces, whereby they are somewhat wedge-shaped in cross-section, as shown in Figs. 2 and 3, being widest at their inner peripheral portions or where they engage with the aforesaid plain surfaces 11 of the pipe-sections, and these soft-metal collars are adapted to slide upon the said plain surfaces of the pipe-sections to follow the movement of the lock or jam nuts B, one of which nuts is screwed upon the threaded portion of each pipe-section, and the end of a jam or lock nut that is to engage with a packing-collar is provided with a dished or annular concave surface 12, and when the coupling is to be made between two pipe-sections, as shown in Figs. 1 and 2, the intermediate lock or jam nut B' is employed, into which the threaded ends of the pipe-sections A are screwed until the said ends abut at the center of the central nut, whereupon the lock or jam nuts B, traveling upon the threaded portions of the pipe-sections at the rear of the packing-collars, are screwed up in direction of the central nut, carrying the packing-collars along with them, and as both ends of the central nut B' are dished the packing-collars will be compressed between the outer and the inner or central nut, forming a perfectly tight joint, and it is evident that no matter how many times a coupling or uncoupling of pipe-sections is made, in the manner above described, the metal packing-collars will always be ready for use and will have been in no wise injured.

In Fig. 3 we have illustrated a section of a pipe E adapted to be coupled with a fitting D, the latter being illustrated as of a T-shape, although it may be of other form.

At the end of the pipe-section A the threaded surface 14 is turned down, as above described, to provide a smooth surface 15, upon which the soft-metal packing-collar C' has movement, and in Fig. 3 the collar is shown as being interiorly threaded in order that it may be passed over the threaded surface of the pipe-section to the plain surface, and when this collar is compressed its interior threads will be pressed out or will disappear, leaving the collar fitted to slide upon the said plain surface as though it were compressed thereon in the first instance.

Upon the inner section of the threaded surface 14 of the pipe-section E a lock or jam nut $B^2$ is held to travel, having its outer face 17 dished in the manner described with reference to the other lock-nuts, and the outer edges of the receiving-sockets of the fitting D are likewise provided with a dished surface 13 or a concaved or tapering annular recess. Under this construction, when the threaded portion of the pipe E at its outer extremity is screwed into the socket of the fitting a proper distance, the packing-collar will engage with the dished surface 13 of that socket, and by screwing up the lock or jam nut $B^2$ against the collar a perfect joint is obtained.

Under the construction of coupling just described a tight and reliable joint is obtained that requires less room to operate than joints usually made for high pressures. The construction is also very simple, and less time is consumed in making a joint than ordinarily. The soft-metal packing has heretofore been called a "collar," but it will be understood that it is likewise a ring.

Having thus described our invention, we claim as new and desire to secure by Letters Patent—

1. In a pipe-coupling, a pipe having a plain surface, and a threaded surface at each end of the plain surface, one of said threaded surfaces being adapted for connection with a mating pipe or union, a packing ring or collar whose diameter is approximately equal to that of the pipe at its plain surface, while the thickness of the packing-ring is less than the length of the plain surface of the pipe, whereby said ring is adapted to slide on said plain surface, and a nut screwing on the other threaded surface to compress the said ring, substantially as described.

2. In a pipe-coupling, a pipe having a plain surface, and a threaded surface at each end of the plain surface, one of said threaded surfaces being adapted for connection with a mating pipe or union, a packing ring or collar of unbroken continuity and of a thickness smaller than the length of the said plain surface whereby the ring is adapted to slide on said plain surface, and a nut screwing on the other threaded surface of the pipe and adapted to compress the packing-ring, substantially as described.

3. In a pipe-coupling, a pipe having a plain surface and a threaded surface at each end of the plain surface, a packing ring or collar substantially wedge-shaped in cross-section and adapted to slide on the plain surface of the pipe, and internally-threaded tubular pipe-sections or nuts screwing on the threaded surfaces of the pipe, said sections having their ends opposed to the packing-ring conically recessed or cupped to conform to the shape of the side surfaces of the collar, said sections being adapted to engage and compress the packing-ring, substantially as described.

4. In a pipe-coupling, a pipe-section having a plain exterior surface located between two threaded surfaces, a packing ring or collar mounted on the plain surface, a lock or jam nut located upon the threaded surface, and having its end opposed to the packing ring or collar shaped to conform to the side surface of the same, and a fitting or like socket, having its outer face provided with a recess conforming in shape to the side contour of the packing ring or collar, whereby the ring or collar may be compressed within the outer recessed portion of the socket and the lock or jam nut, as and for the purpose specified.

5. In a pipe-coupling, a pipe having a plain portion and a threaded surface at the end of the said plain portion, a packing ring or collar of less thickness than the length of the plain portion of the pipe, whereby said ring is adapted to slide longitudinally on said plain portion or surface, a nut screwing on the threaded surface of the pipe to engage one end of the packing-ring, and an abutment located at the other end of the plain portion or surface and adapted to engage the opposite end of the packing-ring, substantially as described.

WILLIAM HENRY LE CHARD.
JOHN ARTHUR BEST.

Witnesses:
G. A. BOURGEOIS,
W. B. SHERRICK.